United States Patent
Wootton et al.

(10) Patent No.: US 10,454,281 B2
(45) Date of Patent: *Oct. 22, 2019

(54) RECONFIGURABLE POWER CONTROL SYSTEM

(71) Applicant: Ivani, LLC, Dardenne Prairie, MO (US)

(72) Inventors: Matthew Wootton, O'Fallon, MO (US); John Wootton, St. Louis, MO (US); Justin McKinney, Wildwood, MO (US); Lloyd Herbert King, Jr., Wildwood, MO (US)

(73) Assignee: Ivani, LLC, Dardenne Prairie, MO (US)

( * ) Notice: Subject to any disclaimer, the term of this patent is extended or adjusted under 35 U.S.C. 154(b) by 221 days.

This patent is subject to a terminal disclaimer.

(21) Appl. No.: 15/600,298

(22) Filed: May 19, 2017

(65) Prior Publication Data

US 2017/0288411 A1    Oct. 5, 2017

Related U.S. Application Data (63) Continuation of application No. 14/606,881, filed on Jan. 27, 2015, now Pat. No. 9,692,236.

(Continued)

(51) Int. Cl.
*H02J 5/00* (2016.01)
*H05B 37/02* (2006.01)
(Continued)

(52) U.S. Cl.
CPC .................. *H02J 5/00* (2013.01); *H02J 3/10* (2013.01); *H02J 13/0075* (2013.01);
(Continued)

(58) Field of Classification Search
CPC . H02J 5/00; H02J 3/10; H02J 13/0075; H05B 37/0272
See application file for complete search history.

(56) References Cited

U.S. PATENT DOCUMENTS

| | | | |
|---|---|---|---|
| 5,563,455 | A | 10/1996 | Cheng |
| 7,663,325 | B2 | 2/2010 | McDonough et al. |

(Continued)

FOREIGN PATENT DOCUMENTS

| | | |
|---|---|---|
| CN | 101184353 A | 5/2008 |
| CN | 201319687 Y | 9/2009 |

(Continued)

OTHER PUBLICATIONS

International Search Report, International Patent Application No. PCT/US2015/013127, dated Apr. 24, 2015 (10 pages).

(Continued)

*Primary Examiner* — Scott Bauer
(74) *Attorney, Agent, or Firm* — Lewis Rice LLC (57) ABSTRACT

Systems and methods for the creation of a centrally controlled DC and AC power rail system within a structure. The rails utilize a centralized controller along with a plurality of distributed controllers to allow for power in the rails to be selectively distributed or not distributed to outlets attached to the rails. This allows for power to be distributed without the need for users to utilize hardwired switches, but to instead utilize generally wireless switch modules, which may be implemented in hardware and/or software to control the outlets. It also allows for devices designed to utilize DC power to be directly supplied with such power from the DC power rail without the need to include onboard AC-DC converters with each device.

16 Claims, 4 Drawing Sheets

Related U.S. Application Data (60) Provisional application No. 61/932,085, filed on Jan. 27, 2014.

(51) Int. Cl.
*H02J 3/10* (2006.01)
*H02J 13/00* (2006.01)

(52) U.S. Cl.
CPC ...... *H05B 37/0272* (2013.01); *Y02B 70/3283* (2013.01); *Y04S 20/246* (2013.01); *Y10T 307/367* (2015.04)

(56) References Cited

U.S. PATENT DOCUMENTS

| | | |
|---|---|---|
| 8,531,134 B2 | 9/2013 | Chemel et al. |
| 8,536,998 B1 | 9/2013 | Siu et al. |
| 8,552,664 B2 | 10/2013 | Chemel et al. |
| 8,593,264 B2 | 11/2013 | Umezawa et al. |
| 8,766,556 B2 | 7/2014 | Meyer |
| 8,849,471 B2 | 9/2014 | Daniel et al. |
| 2004/0196140 A1 | 10/2004 | Sid |
| 2009/0256483 A1 | 10/2009 | Gehman et al. |
| 2010/0145545 A1 | 6/2010 | Mosebrook et al. |
| 2011/0141647 A1 | 6/2011 | Garcia et al. |
| 2011/0175553 A1 | 7/2011 | Sampsell |
| 2011/0316341 A1* | 12/2011 | Pichkur ............ H01R 13/6675 307/72 |
| 2012/0092060 A1 | 4/2012 | Ganesan |
| 2012/0181865 A1 | 7/2012 | Muthu |
| 2012/0181974 A1* | 7/2012 | Kuniyosi ................ H02J 3/383 320/101 |
| 2012/0207481 A1 | 8/2012 | Elberbaum |
| 2013/0175863 A1 | 7/2013 | Pan |
| 2015/0005900 A1 | 1/2015 | Steele et al. |

FOREIGN PATENT DOCUMENTS

| | | |
|---|---|---|
| CN | 201467534 U | 5/2010 |
| CN | 201639825 U | 11/2010 |
| CN | 201839492 U | 5/2011 |
| CN | 102131327 A | 7/2011 |
| CN | 102177768 A | 9/2011 |
| CN | 202475882 U | 10/2012 |
| CN | 202738203 U | 2/2013 |
| CN | 202759621 U | 2/2013 |
| CN | 203243557 U | 10/2013 |
| CN | 203251317 U | 10/2013 |
| JP | 2005136532 A | 5/2005 |
| JP | 2006129098 A | 5/2006 |
| JP | 2007159370 A | 6/2007 |
| JP | 2008042998 A | 2/2008 |
| JP | 2008305800 A | 12/2008 |
| JP | 2011101528 A | 5/2011 |
| JP | 2011109784 A | 6/2011 |
| KR | 100887425 B1 | 3/2009 |
| KR | 100912039 B1 | 8/2009 |
| KR | 20090113941 A | 11/2009 |
| KR | 101009613 B1 | 1/2011 |
| KR | 20130012996 A | 2/2013 |
| KR | 20130017298 A | 2/2013 |
| KR | 20140080755 A | 7/2014 |
| KR | 20140120748 A | 10/2014 |
| WO | 2011055199 A1 | 5/2011 |
| WO | 2011062445 A2 | 5/2011 |
| WO | 2012010170 A1 | 1/2012 |
| WO | 2014026226 A1 | 2/2014 |
| WO | 2014109486 A1 | 7/2014 |

OTHER PUBLICATIONS

International Search Report, International Patent Application No. PCT/US2015/058019, dated Feb. 5, 2016 (10 pages).

Examination Report, European Patent Application No. 15740354.4, dated May 22, 2018 (5 pages).

Office Action, PRC (China) Patent Application No. 201580008773.7, dated May 3, 2018 (6 pages).

Supplementary European Search Report, International Patent Application No. EP15740354, dated Sep. 20, 2017 (8 pages).

* cited by examiner

RECONFIGURABLE POWER CONTROL SYSTEM

CROSS REFERENCE TO RELATED APPLICATION(S)

This application is a Continuation of U.S. Utility patent application Ser. No. 14/606,881 filed Jan. 27, 2015, which claims benefit of U.S. Provisional Patent Application Ser. No. 61/932,085, filed Jan. 27, 2014, the entire disclosures of which are herein incorporated by reference.

BACKGROUND

1. Field of the Invention

This disclosure is related to a controller for a power system within a structure such as a residence or business. Specifically, the control system generally serves to provide centralized control of power distribution on both AC and DC circuits wired into the structure.

2. Description of the Related Art

Today there is an increasing emphasis on energy efficiency, not only for the individual and the company, who are the energy consumers, but also for energy providers. This is especially true for electrical energy. The Energy Information Administration (EIA) estimates that in 2011 about 461 Billion kW hours (kWh) of electricity were used in the USA by the residential and commercial sectors. Electricity used for lighting was equal to 17% of total electricity consumed by both of those sectors. Residential lighting consumption was about 186 Billion kilowatt hours of electricity in the USA, or about 13% of all residential electrical consumption. For the commercial sector, lighting consumed about 275 Billion kWh of electricity or 21% of all the commercial sector electricity.

This large consumption of electricity for lighting has led to governmental regulation to utilize more efficient lighting devices and the manufacture of the incandescent bulb (e.g. the lightbulb as originally contemplated in U.S. Pat. No. 223,898 to Edison) has essentially been halted. Instead, lighting is being increasingly supplied through compact fluorescent light (CFL) bulbs and halogen bulbs and to an increasing percentage, light emitting diode (LED) bulbs.

As trends in building new houses increases square footage, the energy consumption of future buildings generally, and specifically the percentage consumed by lighting, will likely continue to rise without a major transition to the use of more efficient light sources. LEDs, for the same level of lumen light emission as an incandescent bulb, can consume as little as one sixth to one tenth of the power of an incandescent bulb. Use of LED technology for lighting, therefore, offers the residential home owner the opportunity to reduce their electrical energy consumption by 10% if used consistently. This opportunity has resulted in a plethora of new light bulbs and new fixtures which utilize LEDs hitting the market.

Generally, the LED bulbs and fixtures that are provided currently are configured to interface into existing fixtures normally utilizing an Edison screw connector in the United States and a universal bayonet type format in many European countries. The LED fixtures are therefore designed to replace traditional incandescent bulbs in existing sockets and fixtures already installed into an older structure. They are, effectively, LED light bulbs where the LEDs and associated control electronics are all self-contained and provided in a format which can simply be attached in place of a traditional incandescent bulb onto the internal AC wiring of the structure.

The "light bulb" carrying the LEDs will, therefore, generally be configured to interface with the existing residential or commercial AC supply (normally 110 V 60 Hz in the US) and will need to supply everything to allow the LED device to operate with simple wired connection to an AC power source. LEDs are, however, direct current (DC) driven solid state devices and, moreover, are low voltage DC devices. The result is that today each "LED bulb" has to carry its own AC to DC conversion electronics to allow for the LED to obtain useable power from the AC based wiring infrastructure in the building. Further, they generally have to include electronics to bleed off excess wattage to make sure that there is not too much power provided to the LEDs.

This drives up cost as the electronics must be mounted on each bulb, and are discarded when the bulb is replaced. It also decreases overall reliability of the LED bulb because it provides for a larger number of electronic components that can fail (LEDs are inherently 40 times more reliable than incandescent filaments, but LED bulbs generally do not show the same multiplier of reliability). Further, individual control electronics also reduce the overall efficiency of the LED lighting system as the AC power has to be converted into DC power at a variety of points resulting in creation of waste heat.

Still further, the heat generated from this conversion can be problematic. Certain LED bulbs can only be installed in certain orientations without presenting possible fire hazards, and, even if heat can be controlled, the creation of waste heat within the LED bulb structure can result in further reliability issues due to potential damage. Thus, while the use of retrofit LED lighting has dramatically reduced power consumption in structures which use them consistently, it is clear that they still operate very inefficiently, and cost much more, than their inherent capability.

If there was a way to provide for DC current to be provided directly to lighting systems, the cost of the bulbs could be dramatically lowered and many of the above problems would be avoided as control electronics could be removed from the LED bulb meaning that the LED bulb itself would need only include the basic LEDs and DC power handling components. Further, a DC power rail within a structure is much safer than an AC rail. It is generally difficult to cause severe damage to the human body with DC power because it has little effect on human electromechanics. However, essentially every structure built or modified since the electrical era began around 100 years ago has been built with internal AC power rails and the power grids of the vast majority of locales are AC power grids.

Certain structures are beginning to take advantage of the benefits of LED lighting directly by providing installed LED lighting which utilizes batteries instead of being connected to the AC grid, or which can be directed to direct energy generation sources such as solar panels which readily produce DC power. While this can be an effective solution, it is far from efficient as even while LEDs can run for many years off of batteries, this arrangement produces a large amount of battery waste and many direct generation sources are only useable in certain circumstances.

The creation of a DC power rail within a residential or commercial building can dramatically change the equation. In the first instance, the need for individual AC to DC conversion for every light or light fixture goes away. Cost is reduced and reliability increased. Furthermore in the event of an outage of the main AC supply, a simple backup of a battery or fuel cell will suffice to ensure that lighting and other potentially essential infrastructure connected to the DC rail is maintained. Further, add on electricity generation systems (such as solar panels) can be used to generate DC power which can be fed directly into the rail. However, such a solution has generally not been possible with current lighting systems or structures.

The cost of wiring (independent of the actual fixture costs) in a new structure generally has two components, first the cost of the wire itself, and second, the cost of the labor to install it. In residential houses the major driver is the labor, but the material is not inconsequential at 20% to 30% of the total cost. The wiring of residential and even commercial lighting is generally straightforward for devices such as outlets and lights where one light or bank of lights is controlled from one switch. However, there are times, such as at a stairwell, hallway, or certain rooms with multiple entrances and exits, where a light is controlled from two or more locations. Similarly fans and plug outlets are sometimes controlled from two or more locations.

In these types of arrangements, the two-way, three-way and higher way arrangement of switches (where the same fixture can be controlled from multiple switches) requires significantly more labor time from more experienced electricians, specialized components, and more wire to interconnect the operation. In effect, if a system is wired simply where the wires connect directly to the outlet from both switches, one has to turn both switches off to turn the outlet off, while any one of them being on will result in power. This does not allow for free toggling. For example, wiring a single bulb to be controlled from two switches with free toggling (where any change on either switch toggles the lights status) requires replacing the standard two-way switches normally used in lighting applications with three-way switches (or an equivalent circuit), wired in a particular pattern. For three or more switches, three-way and four-way switches are required in particular patterns. This complication therefore costs significantly extra to install both in parts (due to the more complicated switches and additional wiring) and labor (to make sure they are connected correctly).

The cause of this complication is that the operation of the switch is physically connected to the functionality of the switch. That is, a light switch, quite literally, is connected into the wire and directly acts as a mechanical switch to allow or stop electrical flow. Because each wire leading into an outlet is either on or off, it can be impossible to provide for the ability to freely toggle power from any of the switches without adding additional paths which reconnect the flow in different ways.

One major problem in all electrical wiring systems is that once an electrician has wired the system during construction (which usually occurs when only the skeleton of the structure exists and it is easy to construct things that will eventually be within walls), the only way to change the system is a physical rewiring of the system. This usually requires the re-running of wires, as well as changes to the switches themselves. This is usually very costly as it can require tearing the surfaces (usually drywall) off of walls to access the wires, or it requires sophisticated tools to thread new wires through difficult to access (and even to see) passageways.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein among other things are systems and methods for the creation of a centrally controlled DC and AC power rail system within a structure. The rails utilize a centralized controller along with a plurality of distributed controllers to allow for power in the rails to be selectively distributed or not distributed to outlets attached to the rails. This allows for power to be distributed without the need for users to utilize hardwired switches, but to instead utilize generally wireless switch modules, which may be implemented in hardware and/or software to control the outlets. It also allows for devices designed to utilize DC power to be directly supplied with such power from the DC power rail without the need to include onboard AC-DC converters with each device.

Described herein, among other things, is a power control system for a structure, the system comprising: a central controller electrically connected to: an AC distributed controller by a wire carrying alternating current (AC) power; and a DC distributed controller by a wire carrying direct current (DC) power; a main breaker connecting said central controller to an AC power source, said central controller including: an AC to DC power converter; and a computer for transferring instructions; wherein, said central controller can transmit instructions and AC power to said AC distributed controller and instructions and DC power to said DC distributed power controller; a plurality of outlets, each of said outlets: connected to at least one of said AC distributed power controller(s) or said DC distributed power controller(s); and including a coupler for connection to a device utilizing AC or DC power; a plurality of switch modules, each of said modules being operatively associated with at least one of said outlets so that when said module is activated: said module transmits a signal to said central controller; said signal is converted by said computer into an instruction; said instruction is sent by said central controller to said distributed controller to which said operatively associated outlet is connected; and power to said outlet is toggled from its present state to a different state such as an opposed binary state.

In an embodiment of the power control system, the AC power source comprises a municipal power grid.

In an embodiment of the power control system, the main breaker comprises a circuit breaker or a fuse box.

In an embodiment of the power control system, the switch module comprises a hardware switch.

In an embodiment of the power control system, the switch module comprises a mobile device.

In an embodiment of the power control system, the switch module comprises a computer.

In an embodiment of the power control system, the AC distributed power controller includes a computer.

In an embodiment of the power control system, the AC distributed power controller includes a plurality of relay switches.

In an embodiment of the power control system, the DC distributed power controller includes a computer.

In an embodiment of the power control system, the DC distributed power controller includes a plurality of relay switches.

In an embodiment of the power control system, at least one of said outlets is designed to be attached to a light emitting diode (LED) illumination device. This LED illumination device need not include a power control circuit and/or an AC to DC converter.

In an embodiment of the power control system, at least one of said outlets is designed to directly connect to a charging cable of a mobile device.

DESCRIPTION OF THE PREFERRED EMBODIMENT(S)

A house or other structure used by humans will traditionally have a power distribution system arranged within it. In common parlance, this is usually referred to as the structures "wiring" as wires will extend from a central main breaker to distribute power which is obtained by the main breaker from an external power grid to a variety of outlets through the structure. In this disclosure, the distribution systems will be referred to as "rails." This is a term commonly used in computer circuit design to refer to the primary source of power on a circuit board but is not commonly used in housing. This term is used herein as it provides for a clearer term more connected with the idea that the rail is the infrastructure portion of the wiring in the structure.

Similarly, this disclosure will refer to power "outlets". In general parlance, a power outlet is generally a point of connection which allows for devices which can be completely external to the power rail to be connected to the power rail. This is as opposed to fixtures which may comprise objects such as ceiling fans or light sockets where the object is actually affixed in a position that does not allow any third party object to connect to the rail at that point. Further, fixtures usually include switches which allow power to them to be turned on or off. The problem with the traditional use of these terms, however, is that a light "fixture" (for holding a light bulb) and a plug "outlet" (into which a table lamp can be plugged) are fundamentally the same. Each will allow an object connected to it via a coupler (e.g. the lamp or light bulb) to be connected to the power rail and powered.

It is also well known that certain residences lack any fixtures, and rely upon switched plug outlets to act as fixtures, and that one can readily attach adapters to light fixtures allowing them to provide plug outlets. Thus, for purposes of this disclosure, any point of connection where an object which does anything other than distribute power within the rail can be connected, is called an outlet. Outlets that include switches allowing power to them to be alternatively supplied or not are switched outlets (with switched outlets generally comprising the vast majority, if not all, the outlets in most embodiments of the system), while those that will always supply power to anything connected to them at all times are unswitched outlets.

For purposes of this disclosure, a "mobile device" may be, but is not limited to, a smart phone, tablet PC, e-reader, or any other type of mobile device capable of executing the described functions. Generally speaking, the mobile device is network-enabled and communicating with a server system providing services over a telecommunication network.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wristwear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the terms "web," "web site," "web server," "web client," and "web browser" refer generally to computers programmed to communicate over a network using the HyperText Transfer Protocol ("HTTP"), and/or similar and/or related protocols including but not limited to HTTP Secure ("HTTPS") and Secure Hypertext Transfer Protocol ("SHTP"). A "web server" is a computer receiving and responding to HTTP requests, and a "web client" is a computer having a user agent sending and receiving responses to HTTP requests. The user agent is generally web browser software.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g. "a remote host"), or may, in verb form, refer to a server providing a service over a network ("hosts a website"), or an access point for a service over a network.

Throughout this disclosure, the term "switch" may be, but is not limited to, a physical switch, an electro-optical switch, a solid state switch or a transistor, or FET or IGBT or any other electronic or mechanical device that can operate as a switch. A switch is generally a two state device that can connect with little impedance one component to another and/or power rail from another with low impedance, and in its second state, can isolate (with high impedance) the two components and/or power rails.

The system and methods discussed herein are designed to provide for an embodiment of a distribution system within a structure, generally a residence, office building, or other human constructed structure, with the ability to have two power rails. One rail is designed to carry alternating current (AC) power while the other is designed to carry direct current (DC) power. Current homes utilize a single rail which distributes only AC power. The rail systems are provided under the control of a central controller (101) and a variety of distributed controllers (201) and (301) that provide switch banks used in conjunction with remote switch modules in place of standard hardwired switches.

Figure 1:
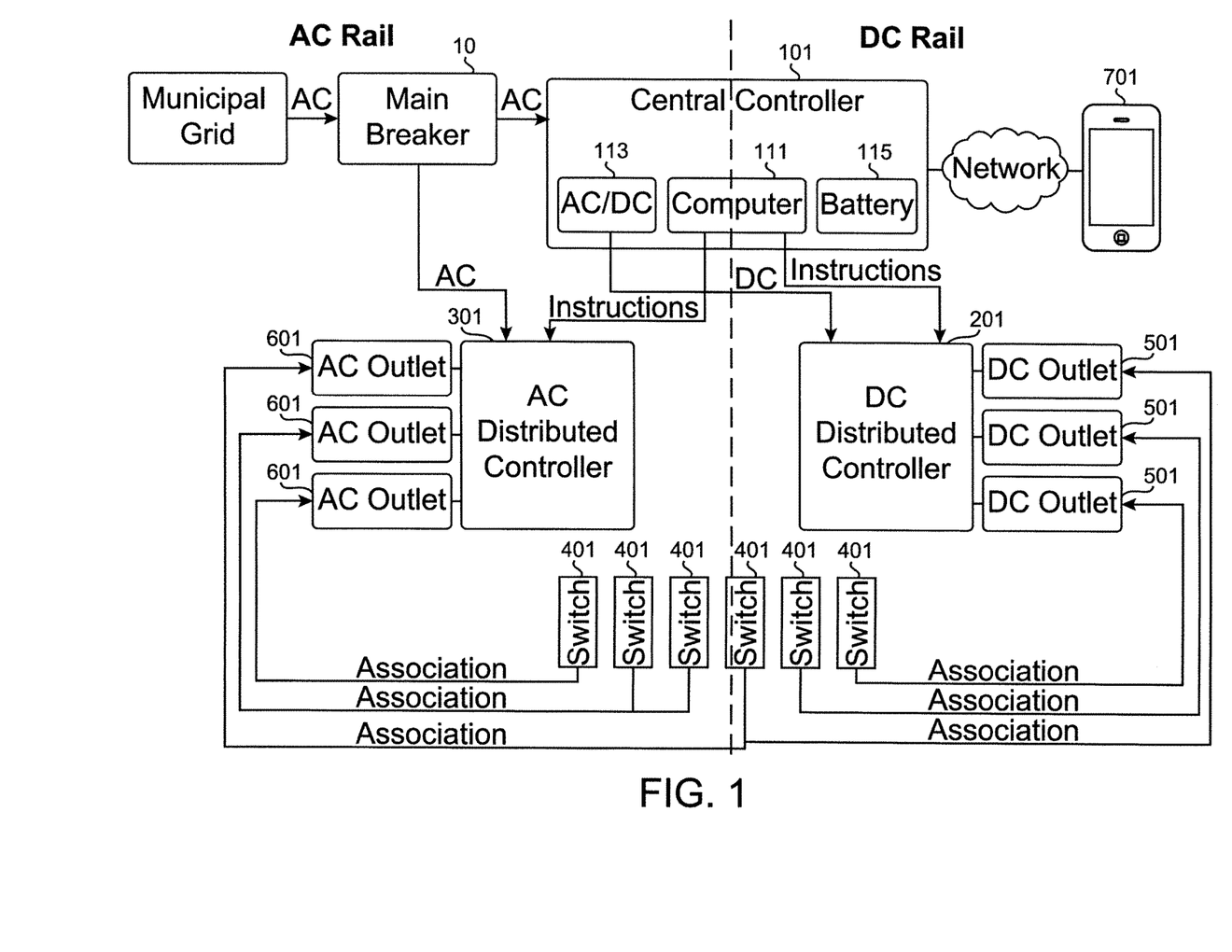
FIG. 1 shows a block diagram of an embodiment of a reconfigurable power control system having AC and DC rails.

An embodiment of a distributed power control system (100) is provided in FIG. 1 in a general block format. In FIG. 1, a central controller (101) is provided which is generally connected to two separate distribution systems. Generally, on the left side of the drawing is the AC distribution components (AC rail) while generally on the right side are the DC distribution components (DC rail). Each side includes at least one distributed controller (201) or (301), and a plurality of outlets (501) and (601) attached to the various controllers (201) or (301).

The central controller (101) acts to connect distributed controllers (201) and (301), can provide "coarse" power management for traditional AC circuits (e.g. to shut off a whole room, side of the house, etc. as is currently done using circuit breakers), and can monitor the "coarse" energy consumption of systems for purposes of efficiency feedback. On the AC side of the distribution grid, the central controller (101) takes in power from a traditional AC main fuse box or circuit breaker (main breaker (10)) taking AC power from a traditional power grid to which the structure is connected. The main breaker (10) is also connected to the AC distributed controllers (301) which are wired into the system and are also supplied power by the main breaker (10). Each AC distributed controller (301) is then attached to at least one AC outlet (601). Essentially everything on the left side of FIG. 1 comprises the AC rail and it includes the main breaker (10), the central controller (101), the AC distributed controllers (301), and the AC outlets (601).

From the central controller (101), there is also attached a DC rail on the right hand side of FIG. 1. This roughly mirrors the AC side and, as on the AC side, the central controller (101) is attached to at least one DC distributed controller (201), each of which is generally attached to at least one DC outlet (501). Thus, the DC rail includes the central controller (101), the DC distributed controllers (201), and the DC outlets (501). It should be noted that there will generally not be a DC main breaker as the DC rail is connected to the main breaker (10) which can be used to shut off power to the entire system and the DC power is generally converted from AC power, as opposed to being supplied directly.

While not required, in an embodiment, the central controller (101) may be connected to a DC power source. It should be understood, that at the time of this writing, municipal electrical grids are generally AC only. However, in the future, that may change and DC power from a connected grid may be provided directly to the central controller (101) via a DC breaker or similar connection. Further, the concept of microgeneration, where power for a structure is not only obtained from a large central power generation plant via the grid but from power generation limited to the structure (e.g. attached solar panels or windmills) is gaining in popularity. Some of these microgenerators will readily produce AC power (e.g. windmills), while others more readily generate DC power (e.g. solar panels). To the extent that a localized power source is provided, it will generally be connected into the system via the appropriate access point. For an AC source, this will be into the main breaker (10); for a DC source this would generally be directly into the central controller (101).

In the embodiment of FIG. 1, the central controller (101) provides for the primary and "coarse" control on distribution of power along both the AC and DC rails. The central controller (101) also serves as an AC to DC power conversion system which produces a generally "low voltage" DC signal in a highly efficient manner. The efficiency is primarily provided by it being a single point of conversion. This allows for more robust electronics to be used in conversion, for there to be fewer electronic components used, and for the system to generally centralize AC to DC power conversion. In addition to AC and DC power conversion at the central controller (101), depending on the embodiment, the controller may also have access to a variety of DC generation systems which can be distributed directly as contemplated above.

The central controller (101) is generally located near, and preferably alongside or even internal to, the main breaker (10) (a fuse box or circuit breaker in most cases) of a structure. Power for the central controller (101) will generally be supplied from the main breaker (10) which, barring special circumstances, will supply a continuous supply of AC power to the central controller (101) and the AC distributed controllers (231). In the event that the main breaker (10) is tripped, or power is cutoff (e.g. because of a portion of the municipal grid being damaged in a storm), power may be supplied to the central controller (101) via an attached DC source (such as, but not limited to, solar panels), from a storage system such as batteries, or emergency backup generators (such as, but not limited to, hydrocarbon fueled electrical generators).

The central controller (101) generally has three primary sub-elements, namely, control electronics or computer (111), such as, but not limited to, a digital processor usually in combination with memory components and communication components such as a wireless receiver of types well known to those of ordinary skill in the art for receiving signals from a network. The computer (111) will generally be configured to receive various forms of input signals, convert those signals into a command for the distributed controllers (201) and (301), and transmit that instruction to a similar computer at the appropriate controller (201) or (301). Alternatively, the instructions may be sent in a fashion that does not require a computer to interpret at the distributed controllers (201) or (301), eliminating the need for a computer to be present there.

The central controller (101) will also generally include an AC-DC converter (113) and may include a small internal backup DC supply (115) in the event of a main power failure. This last option is optional but will generally be present to provide for some control and power to the central controller (101) in the event of AC power not being received from the main breaker (10).

The AC-DC converter (113) will generally comprise electronics configured to take in standard AC voltage supplied from the electrical grid to which the structure is attached, and convert this to a DC voltage. The input AC voltage may be part of the main signal and supplied in any voltage and amperage as can the DC voltage. The AC-DC converter (113) in the central controller (101) will commonly be connected to the main breaker (10) after the main breaker (10) has been connected to the grid and, therefore, the main breaker (10) can distribute power to the central controller (101) in the traditional manner.

The central controller (101) would, thus, take in standard AC grid power from the main breaker (101). This power is used both to power the computer (111) as well as supply a power source to the AC-DC converter (113) which isolates it, rectifies it, and outputs a coarse (in terms of voltage stability and ripple) low voltage DC output to the DC distributed controllers (201).

To ensure expandability for both residential houses and other structures, of differing square footage, the AC-DC converter (113) can be provided in a modular form within the central controller (101) where the amount of conversion capability in the central controller (101) is regulated by the number of AC-DC converter (113) modules installed. In an embodiment, each module may be capable of nominally handling 500 watts. Structures requiring more DC power than this from a single central controller (101) are accommodated by providing additional slots within the central controller (101) mounting extra AC-DC converter (113) modules which would add capability in generally 500 watt increments. AC-DC converter (113) modules would simply be slotted as needed to meet the power demand of the DC rail.

These AC-DC converter (113) modules would be fairly straightforward comprising necessary AC-DC converter (113) electronics appropriate for the size of conversion they will perform, and a form of quick release electrical connector allowing for them to be quickly connected and disconnected from the central controller (101). Preferably, the AC-DC converter (113) modules would be short-circuit proofed, and they will be able to measure and store the output current and voltage of that AC-DC converter (113), thereby establishing the system power consumed by each module.

The output of the AC-DC converter (113) in the central controller (101) is the raw supply that feeds each DC distributed controller (201). Further, that DC power can also provide charging of the backup power unit (115) if provided, or can feed an attached DC power storage system, if desired. In an embodiment, the central controller (101) could also supply excess power back into the municipal grid, if the grid was capable of such an action.

Connected to the central controller (101) is at least one and generally a plurality of DC (201) and AC (301) distributed controllers. These distribute electricity from one to many individually switchable circuits within themselves to provide for independent control of connected DC (501) and AC (601) outlets. Each of the distributed controllers (201) and (301) may also relay information from the switch modules (401) to the central controller (101); communicate status information to the central controller (101); communicate with switch modules (401) directly; and/or monitor energy use at the distributed controller (201) or (301) and relay this information to the central controller (101) or an external monitor. Generally, the DC (201) and AC (301) distributed controllers will comprise hardware components and switches with an attached computer. However, in an alternative embodiment, they may be implemented (along with the modules (401) and/or central controller (101)) in a purely software construction. In such an embodiment, the operations of the structures will generally be logically separated, by no means required. It should also be recognized that since each to the DC (201) and AC (301) distributed controllers (and in fact the modules (401)) can include software functionality, in an alternative embodiment, the computers in those devices can assume the responsibilities of the computer (111) in the central controller, or in any of the other devices in the system.

In an embodiment, the DC distributed controllers (201) will be used primarily to control outlets (501) for use with a low voltage DC lighting system. The outlets are generally built into the structure into which the system (100) has been installed. The lighting system is generally based around providing specially designed outlets (501) for connection of low voltage LED "light bulbs" which are easily replaceable, highly reliable, unobtrusive, provide a low fire risk, and can utilize inexpensive DC wiring. They usually have an advantage over current LED bulbs in that they do not need onboard AC-DC conversion capability and associated electronics. While lighting is not the only purpose of the DC rail in all embodiments, and the DC rail will generally be designed to provide a variety of outlets (501) suitable for different DC powered devices, because of the efficiencies of LED lighting, it is expected, in an embodiment, that the principle source of DC outlets (501) would be specialized outlets for connection to LED lighting.

Because the DC rail is custom built in a preferred embodiment, the couplers provided by the DC outlets (501) can utilize any form of connection technology and will be designed to directly interface with DC powered devices. Thus, lighting outlets (501) on the DC rail may, but do not need to, use Edison screw couplers. In an embodiment, the outlets (501) would not use such couplers as this could encourage the installation of traditional LED bulbs into these outlets (501). As traditional bulbs include unnecessary electronics when connected to a DC rail as opposed to the AC rail, they would be inefficient in this application, if they worked at all.

Instead, the couplers in the outlets (501) used for lighting will generally be specific to a class of LED bulbs which are designed to directly connect to a DC rail and comprise minimal electronics hardware other than the specific LED components. Further, other useful DC based couplers can also be provided at outlets (501) for connections to other DC devices. Connectors in the outlets (501) can include the currently ubiquitous universal serial bus (USB) 5V connector commonly used on the charging cables for mobile devices such as smartphones, tablet computers, and portable music players. Similarly automotive cigarette lighter style connectors (e.g. ANSI/SAE J563 specification) at 12V or 6V can be provided. Thus, DC charging of mobile devices can be provided directly from the DC rail and DC powered devices can be plugged directly into the rail. Further, specialized DC operations can be provided via outlets (501) such as providing couplers designed to directly connect to smart electronic fixtures (such as, but not limited to, thermostats, smoke alarms, carbon monoxide detectors, or even certain computers) or built in devices such as chargers for removable rechargeable chemical batteries, flashlights, or radios.

Each DC distributed controller (201) is nominally a unit associated with a logical division in a structure. Thus, each DC distributed controller (201) may correspond to a level of a residence, a room, a location in a structure (e.g. the ceiling), a logical bank of outlets (e.g. 10 outlets which light a similar area such as the exterior of the structure), a single outlet, or some other form of logical subdivision.

Generally, each DC distributed controller (201) comprises a bank of solid-state DC relays, which are activated in accordance with the commands from the computer (111), associated communication electronics, and memory onboard the DC distributed controller (201). AC distributed controllers (301) are generally similar but receive power to be distributed directly from the main breaker (10) as opposed to the central controller (101) which will generally only send instructions. Alternative switches, or devices which may behave in a switching or changing capacity even if they don't actually switch can be used instead of or in addition to the relay switches contemplated herein. Specifically, the switching can be accomplished by any hardware or software system which is capable of modifying any property of the voltage which is to be provided from the distributed controller (201) or (301) to the outlets (501) or (601).

A DC distributed controller (201) generally receives as instruction a serial word from the computer (111) that designates the desired state of a relay or simply to change a relay from one binary state to another (e.g. from on to off or off to on). It also receives coarse power from the AC-DC converter (113). Generally the coarse power received at the DC distributed controller (201) is DC to DC converted at the DC distributed controller (201) to a precise voltage based on the type and number of outlets (501) connected to the distributed controller (and those outlet's purpose), and fed to each relay as the input to a pole of the relay. Upon actuation, each relay in turn feeds each outlet (501) associated with it. The wiring from the distributed control point DC unit (201) is preferably wiring designed to enhance transport of low voltage, low wattage, DC power.

Figure 2:
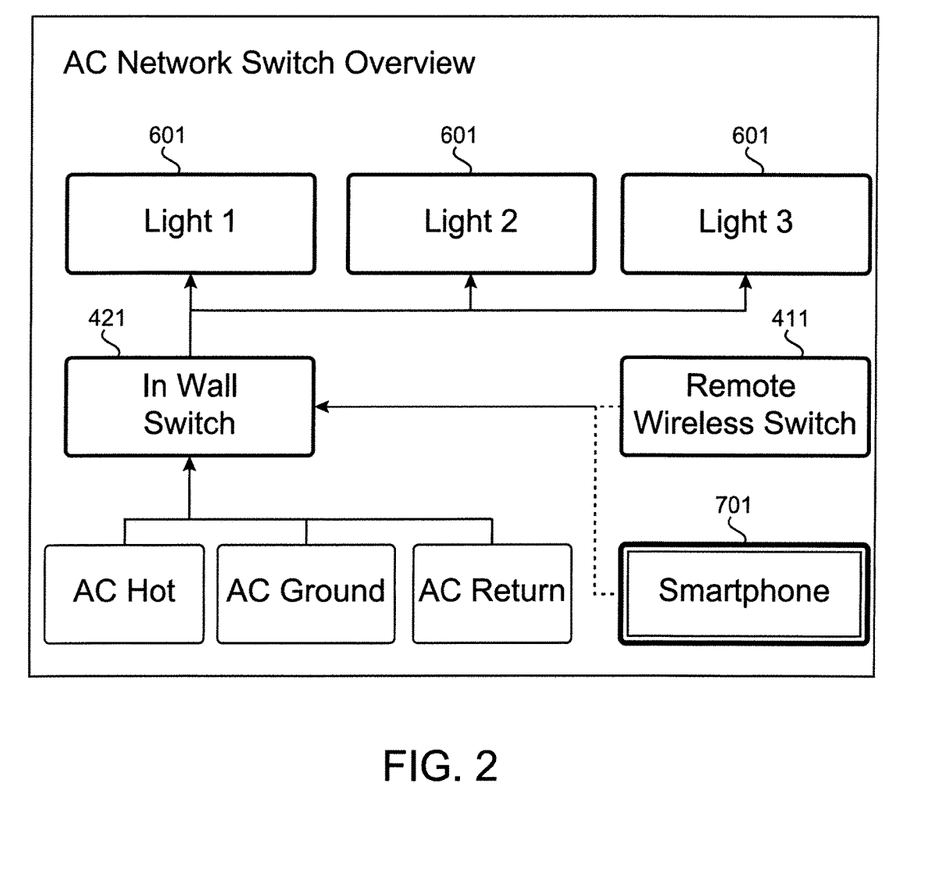
FIG. 2 shows a block diagram of an embodiment of how the AC rail can be connected to outlets.

As with the DC side, the AC side includes at least one and generally more AC distributed controllers (301) which control AC outlets (601) in the structure. These units (301) similarly receive a serial command signal from the central controller (101), and activate or de-activate a single phase AC line, thereby giving the central controller (101) control over designated AC outlets (601) in the same fashion as it has with DC outlets (501). Similar control may be provided for other AC lines such as, but not limited to, three-phase lines, if desired. FIG. 2 provides an embodiment of how the AC line can be connected to AC outlets (601) and various switch modules (401).

It should be apparent from the above that the operation of the distributed controllers (201) and (301) provides for a variety of different control methodologies on both power rails. In particular, as the individual distributed controllers (201) and (301) each control a portion of the power rail systems within the structure, the individual distributed controllers (201) and (301) can control both the entirety of outlets (501) and (601) on that distributed controller (201) or (301), as well as any individual outlet (501) and (601) on that distributed controller (201) and (301) by simply determining how to distribute power from itself to the outlets (501) and (601) it is connected to. Specifically power can be stopped from any point after the main breaker (10) to essentially any subset of outlets (501) and (601) by simply configuring the distributed controllers (201) and (301) in a fashion to only distribute as desired. One would also notice that in some embodiments it is actually possible to distribute both AC and DC power at different times to the same outlet (501) or (601) in certain circumstances and wiring patterns.

Because of this reconfigurable control of power, switches for the outlets (501) and (601) in the structure can now be provided which are disconnected from the wiring of the specific outlet (501) or (601) that they are to control. For this reason there is provided at least one, and generally a plurality of, switch modules (401). These are referred to as "stick on" as they can generally be placed anywhere and do not require a fixed attachment point or connection. The switch modules (401) provide "switches" which send a signal back to a distributed controller (201) or (301) or more commonly the central controller (101) when they are activated by a user (e.g. by pushing a button on their face, applying heat to them, etc.).

The switch modules (401) are generally unobtrusive; generally will be powered by a primary or secondary battery or be self-powered such as, but not limited to, by attached solar cells or will obtain power via a wireless systems; and can be constructed to resemble light switches or other common switches people are familiar with today. The switch modules (401) are generally designed to be easily repairable and modular so they easily combined into larger switching banks (e.g. two can be placed next to each other); and can provide additional switching functionality (e.g. using sensor technologies to control switching such as through changes in temperature, light, or motion) as desired in the same manner as todays current hardwired light switches.

The central controller (101) via the computer (111) provides for interaction between the power rail infrastructures and these modules (401). The computer (111) is generally in communication, either by wire or wirelessly, to all switch modules (401), any remote sensors used in the system (e.g. a heat sensor for monitoring a room), and potentially external mobile or computing devices (701), such as, but not limited to, computers, tablets, and cell phones. The computer (111) is able to receive signals from any or all of these devices generally through a network to which the device (701) and the computer (111) are connected. In an embodiment, this may be through the use of a specialized mobile device application ("app") or may be through a user access a web site or other Internet portal through which they can give instructions to the computer (111).

Upon receipt of a command (e.g. a toggle request from a module (401) or a change request form a mobile device (701)), the computer (111) outputs the corresponding decision to the appropriate distributed controller (201) or (301). The computer (111) generally instructs the distributed controller (201) or (301) to set the state of its relays which will toggle whatever relay is connected to the outlet (501) or (601) associated with the switch module (401) that has been activated. In the case of DC distributed controller (201) being the relevant one, the DC distributed controller (201) is instructed to set either individual relays controlling individual outlets or banks of relays to configure one outlet or multiple outlets simultaneously.

A similar process would occur with an AC distributed controller (301), if appropriate. All of this is generally under software control. The computer (111) maintains in memory which outlet(s) is/are controlled by each switch module (401), and/or on remote sensor, and/or remote device (701). Effectively, this is what device controls what item currently. The computer (111) will also generally store in memory an intrinsic logic of operation so that even in the event of a power failure emergency commands can be given.

The computer (111) is generally programmed via an initiation mode which sets connections between switch modules (401) and outlets (501) or (601) and can be reprogrammed at any time. Thus, a user can simply indicate that a particular module (401) is connected with a particular outlet or outlets (501) or (601) in the central controller (101) (or in one of the distributed controllers (201) or (301)). The connections are generally stored in an onboard memory of the computer (111).

Whenever the switch on that particular module (401) is activated, the computer (111) receives a signal indicative of the activation and looks up, based on the specifics of the signal received, which outlet (501) or (601) that module (401) corresponds to. The computer (111) then sends an instruction to the distributed controller (201) or (301) associated with that outlet (501) or (601) which will serve to toggle the relays in that distributed controller (201) or (301) so as to change the current state of the outlets (501) or (601) based on the instructions. Generally, this instruction will be to change the outlet's (501) or (601) current state to their other binary state (e.g. from off to on or from on to off), but more complicated controls may also be implemented.

The switch modules (401) consist of individual objects that, when activated or toggled, transmit a signal to the central control point unit (101) to change the status of a particular outlet (501) they are currently associated with in the controller's (111) memory. Because they are not hardware switches, these modules (401) can be located anywhere convenient in the structure and actually need not be "switches" at all. There can be multiple modules (401) commanding any given outlet (501) with no need for specialized wiring or switch design.

Figure 3:
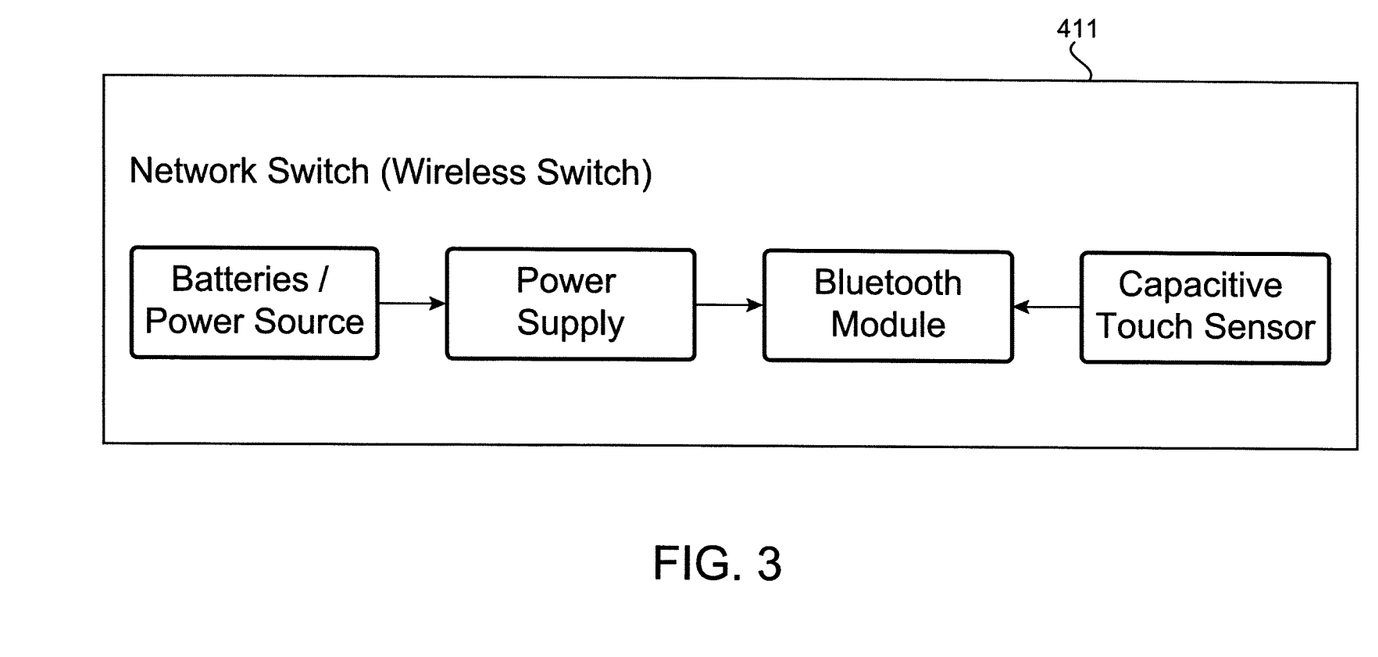
FIG. 3 shows a block diagram of an embodiment of a wireless switch module.
Figure 4:
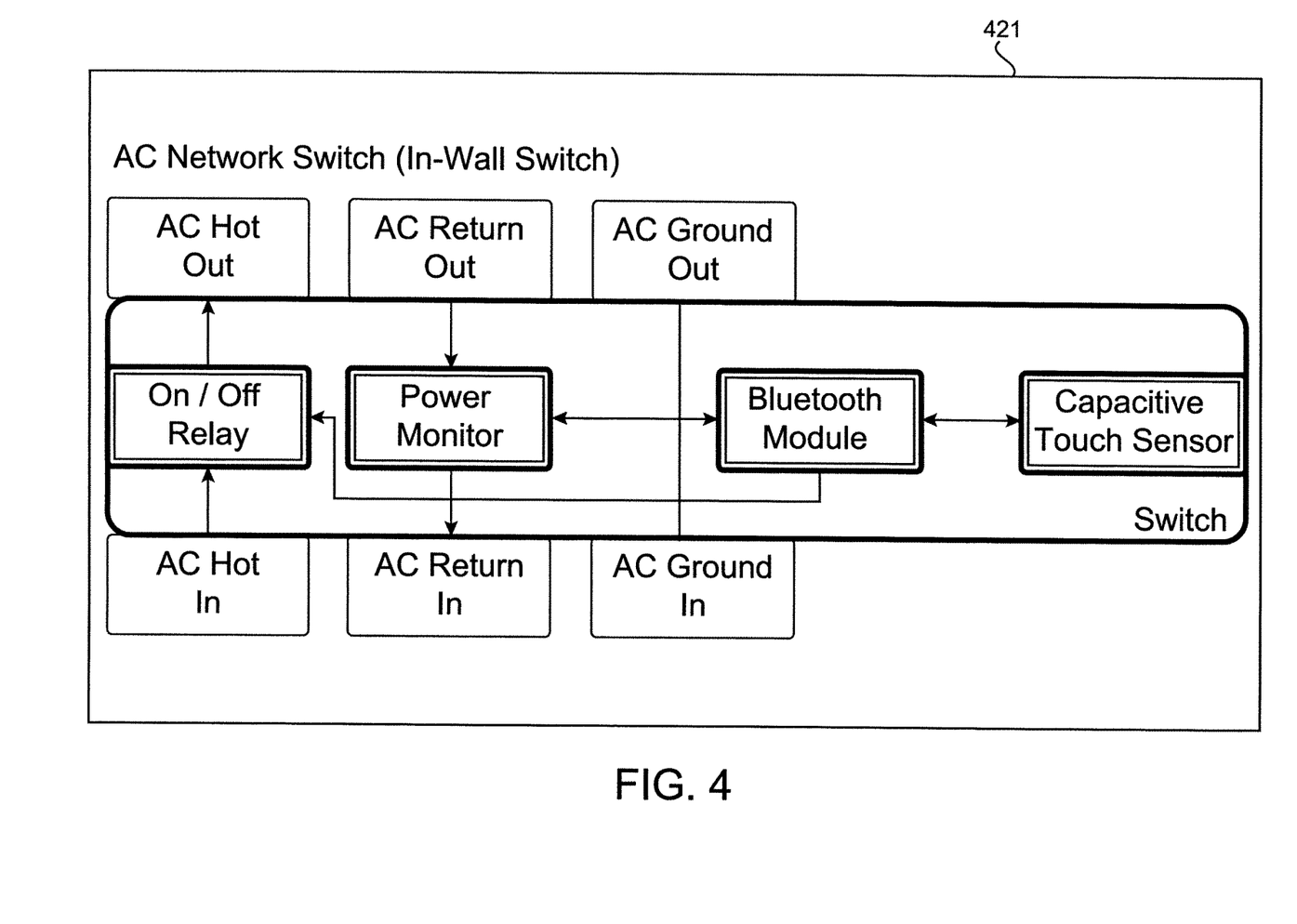
FIG. 4 shows a block diagram of an embodiment of a wired switch module.

There does not need to be any physical connection between these modules (401) or any other component of the system. In an embodiment the modules may be connected to other elements of the system entirely wirelessly, e.g. using Bluetooh™ protocols. An embodiment of such a module (411) is provided in FIG. 3. In an alternative embodiment, the modules (401) can be provided with a mixture of wireless and wired connections, or a purely wired connection. An embodiment of such a module (421) is shown in FIG. 4. The embodiment of FIG. 4 can be particularly useful to replace a traditional wall mounted hardware switch which may already be in place in an existing structure.

Modules (401) can be either powered by a replaceable or rechargeable battery, self-powered by exploiting the piezoelectric effect or including a variety of power sources such as kinetic or solar generators, or can obtain power via wireless power technologies as known to those of ordinary skill in the art. This allows them to function completely independently of position allowing them to be positioned anywhere within communication range of the central controller (101) either directly or via any kind of connected network.

It should be apparent that the switch capability of the modules (401) does not have to be an embodiment in any particular type of hardware device. In an embodiment a device such as a computer or mobile device (701) can simulate a module (401) and could therefore control some or all of the outlets (501) and (601). Similarly, the module (401) can be activated without any form of switching occurring. For example, it could simply return a temperature reading which, when it passes a certain threshold, triggers the central controller (101) to make a relay change.

Specialized instructions can also be sent with the modules (401) being activated as part of the signal. This can include a dimming signal where the distributed controller (201) or (301) would not disconnect the outlet (501) or (601) from the power rail but would lower the amount of power provided or could include control signals for devices attached to the outlet. For example, if an LED light was connected that could provide a variety of colors, a module (401) could comprise a rotating switch with multiple positions. Each position could correspond to a particular color and, as the switch was turned on, the module (401), the central controller (101) and/or distributed controller (201) associated with that light could send not only power, but a control signal which serves to instruct electronics on the LED device to change color.

It should be apparent that one of the primary benefits of the system (100) can be in lighting of the structure. Inclusion of the DC rail in the structure allows for all or a majority of lighting to be a low voltage lighting system which is preferably entirely LED-based and provides all built-in lighting needs for the structure. Each light receives its individual power from an outlet (501) attached to a DC distributed controller (201). As the LED receives its power from the DC rail, there is no need for the more expensive AC-DC conversion at each light and there is no need to include AC-DC conversion technology on the LED unit making it generally simpler, more reliable, and less expensive to build. The LED device will fit into an outlet that has a universal interface for such LED devices and can operate according to a standard operational protocol, such that a plethora of light fixtures can be created and accommodated easily by the system.

There are a significant number of expected advantages of the systems and methods discussed herein over the current way of building residential houses and commercial buildings. In the first instance, while maintaining the same light levels in terms of lumens per square foot in each designated area, the system can add incredible convenience and flexibility while reducing energy costs. Running low voltage, low wattage DC wiring essentially from the main breaker (10) (specifically from the co-located central controller (101)) to accommodate DC devices such as LED lighting will reduce significantly the cost of wiring. With the price of copper continuing to rise, the savings today and in the future are far from insignificant.

Secondly, having separated the command of the operation or actuation of the switch from the functionality of the switch, because the distributed controller (201) or (301) provides the physical switch while the module (401) provides the "indicator" of the switch, significantly simplifies the complexity of wiring. In its simplest form, a light simply toggles from its present state regardless of how many modules (401) are presently associated with that outlet or which one is pressed. Further, if a module (401) was to have a battery or other catastrophic failure resulting in it completely ceasing to function, the rest would still work perfectly well and it could be readily bypassed. In the present systems and methods, each light is operated from a single pole of a relay in the distributed controller (201) or (301) which is either actuated or not.

Whether the command for operation comes from one source or multiple sources is irrelevant to the simplicity of the wiring as the switching commands are all executed at a single switch (namely at the relays in the distributed controller (201) or (301)), regardless of where a signal comes from. Instead, each switch module (401) can act simply as a toggle so that, when any device is toggled (pushed or switched via any indication hardware or software), the distributed controller (201) or (301) simply toggles the current state of the associated outlet (501) or (601). Again, this greatly reduces the labor costs of installation.

Further, as the operation of the relay is controlled by the commands from the central controller (101) that receives requests for change from the switch modules (401) within the residence, or remote sensors or could be controlled remotely from a mobile device or a computer (701) via a network. This provides total flexibility and control of all electrical power within the residence or commercial building. The configuration and control of the lighting and other DC driven devices is now independent of the wiring. This would enable a user to buy a certain number of modules (401) and allow them a massive number of possible switch configurations without need to ever rewire the system.

The present system further facilitates individually activated outlets (501) and (601) (which with prior systems were always activated) to be conveniently located or co-located and allows them to be inactive until required to be used. This can make a structure significantly safer for crawling or just inquisitive young children as without a load in an AC outlet (601) and an associated switch being "on", the system (100) can simply make sure that there is no power at the AC outlet (601). Such inactivation command can be placed out of the child's access or reach further improving safety. Thus, each AC outlet (601) could not only be covered to prevent a child interacting with it, it could be literally off (with no signal running through it) unless a load was connected to the outlet and the outlet was commanded to be on.

In an embodiment, there is disclosed herein a system which is comprised of a controller, either centralized or decentralized, that controls: by switch/button activation command, remote and directly wired; by sensor command, remote and directly wired; by pre-programmed cycle command; or by remote computing unit the lighting of: a residence (indoor or exterior); or a commercial property (indoor or exterior); either at: an individual light fixture, or as a group of light fixtures; wherein the fixture or fixtures to be controlled are independently linked to their control inputs such that switching commands and the switching of the lighting fixtures are not directly coupled.

Depending on the embodiment, the system may additionally include a controller, either centralized or decentralized, that controls one or more AC outlets in a residence, or a commercial property: by switch/button activation command, remote and directly wired; by sensor command, remote and directly wired; by pre-programmed cycle command; or by remote computing unit to allow a utility company to remotely activate/de-activate outlets (e.g. hot water heaters).

In an embodiment, the control of lighting fixtures may include a dimming capability.

In an embodiment, switching commands are provided with a security code, both for information security and determining the priority of inputs.

In an embodiment, the DC supply is derived from: a primary source such as the residence AC mains; or a backup supply, such as a battery, a fuel cell, solar cell, wind generator or standby generator; and wherein the DC supply will provide the primary power for: the property lighting; recharging of the backup system; any DC operated sensor such as a fire alarm; or any device that maybe operated from a DC supply such as a DC ceiling fan.

In an embodiment, the system includes a backup power supply system which performs the following functions: charges the back up or secondary DC source when the primary source is available; activates automatically to sustain the lighting system and other devices that operate on the DC supply such as fire alarm sensors in the event of a failure of the primary supply; and switches automatically back to the primary supply once that source returns to being available.

In an embodiment, the system is additionally capable of: calculating or estimating the energy savings from its operation; measuring the residence or commercial unit energy consumption by category (e.g. lighting, heating, cooling, cooking, water heating) as well as total consumption; and correlating the energy saving and the consumption.

It should be recognized in an embodiment, that the system can be used for multiple purposes such as a security system (with appropriate sensors), lighting system, climate control system, or any other system that can be activated/deactivated: by switch/button activation command, remote and directly wired; by sensor command, remote and directly wired; by pre-programmed cycle command; or by remote computing unit. The multiple purposes can be activated/deactivated: by switch/button activation command, remote and directly wired; by sensor command, remote and directly wired; by pre-programmed cycle command; or by remote computing unit.

In an embodiment, light fixtures are wired using thin conductors as to be installed over the walls with the fixture connection affixed directly to the end of the wire.

In an embodiment, control of the system is governed by an external set of rules for the purposes of switching devices on and off in accordance with some predetermined algorithm (e.g. turning outside lights on and off according to the scheduled sunrise and sunset).

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A method for operating a power control system comprising:
    providing a controller electrically connected to:
        an AC distributed controller by a wire carrying alternating current (AC) power; and
        a DC distributed controller by a wire carrying direct current (DC) power;
    providing a main breaker connecting said controller to an AC power source, said central controller including:
        an AC to DC power converter; and
        a computer for transferring instructions;
        wherein, said controller is configured to transmit instructions and AC power to said AC distributed controller; and
        wherein, said controller is configured to transmit instructions and DC power to said DC distributed power controller;
    providing a plurality of outlets, each of said outlets:
        connected to at least one of said AC distributed power controller(s) or said DC distributed power controller(s); and
        including a coupler for connection to a device utilizing AC or DC power;
    providing a switch module operatively associated with at least one of said outlets;
    activating said module;
    said activated switch module transmitting a signal to said central controller;
    said controller converting said received signal into an instruction;
    said controller transmitting said instruction to said distributed controller to which said operatively associated outlet is connected;
    toggling power to said associated outlet from its present state based on said instruction received by said distributed controller.

2. The method of claim 1 wherein said AC power source comprises a municipal power grid.

3. The method of claim 1 wherein said main breaker comprises a circuit breaker or a fuse box.

4. The method of claim 1 wherein said switch module comprises a hardware switch.

5. The method of claim 1 wherein said switch module comprises a mobile device.

6. The method of claim 1 wherein said switch module comprises a computer.

7. The method of claim 1 wherein said AC distributed power controller includes a computer.

8. The method of claim 1 wherein said AC distributed power controller includes a plurality of relay switches.

9. The method of claim 1 wherein said DC distributed power controller includes a computer.

10. The method of claim 1 wherein said DC distributed power controller includes a plurality of relay switches.

11. The method of claim 1 wherein at least one of said outlets is configured to be attached to a light emitting diode (LED) illumination device.

12. The method of claim 11 wherein the LED illumination device does not include a power control circuit.

13. The method of claim 11 wherein the LED illumination device does not include an AC to DC converter.

14. The method of claim 1 wherein at least one of said outlets is configured to connect directly to a charging cable of a mobile device.

15. The method of claim 1 wherein:
    said switch module is one switch module in a plurality of switch modules, each of which is operatively associated with at least one of said outlets;
    in said activating step, activating at least one of said plurality of switch modules;
    in said transmitting step, said at least one activated switch module transmitting said signal to said central controller.

16. The power control system of claim 1 wherein said toggling step comprises toggling said power to an opposed binary state.

* * * * *